United States Patent
Perry

[11] Patent Number: 5,968,218
[45] Date of Patent: Oct. 19, 1999

[54] INVERT CYLINDER MECHANISM FOR GLASS FORMING MACHINE WITH REMOVABLE SHOCK ABSORBER AND METHOD OF REMOVING THE SHOCK ABSORBER

[75] Inventor: Jack I. Perry, Maumee, Ohio

[73] Assignee: Owens-Brockway Glass Container Inc., Toledo, Ohio

[21] Appl. No.: 09/127,381

[22] Filed: Jul. 31, 1998

[51] Int. Cl.$^6$ .................................................. C03B 35/04
[52] U.S. Cl. .................................... 65/27; 65/68; 65/172; 65/232
[58] Field of Search ................................ 65/27, 68, 171, 65/172, 232, 235, 236

[56] References Cited

U.S. PATENT DOCUMENTS

| | | | |
|---|---|---|---|
| 3,149,951 | 9/1964 | Mennitt et al. | 65/235 |
| 3,233,999 | 2/1966 | Mumford | 65/359 |
| 3,445,218 | 5/1969 | Trudeau | 65/235 |
| 3,573,027 | 3/1971 | Nuzum, Sr. | 65/235 |
| 3,617,233 | 11/1971 | Mumford | 65/307 |
| 3,622,305 | 11/1971 | Becker | 65/229 |
| 4,094,656 | 6/1978 | Colchagoff et al. | 65/81 |
| 4,111,674 | 9/1978 | Zappia | 65/77 |
| 4,133,625 | 1/1979 | Kellermann et al. | 425/394 |
| 4,637,827 | 1/1987 | Nebelung et al. | 65/235 |
| 5,358,543 | 10/1994 | Kozora | 65/319 |
| 5,547,485 | 8/1996 | Jones | 65/260 |

*Primary Examiner*—Sean Vincent

[57] ABSTRACT

An invert cylinder mechanism for a glass container forming machine of the I.S. type, the invert cylinder mechanism having a piston that is moveable along a rectilinear path between inner and outer positions within an annular housing to cause a cylinder rod attached to the piston to extend from said annular housing and to then retract back into said annular housing. A shock absorber is positioned within a recess of the annular housing with its longitudinal central axis spaced from and extending parallel to the longitudinal central axis of the rod. The shock absorber is engaged by the piston as the piston reaches its outer position to absorb inertial loads as the piston decelerates to a stop at its outer position. The recess has an opening out of alignment with the longitudinal central axis of the installed shock absorber, and the shock absorber is removable through the opening along its longitudinal central axis after first pivoting the shock absorber with respect to the longitudinal central axis of the rod.

7 Claims, 4 Drawing Sheets

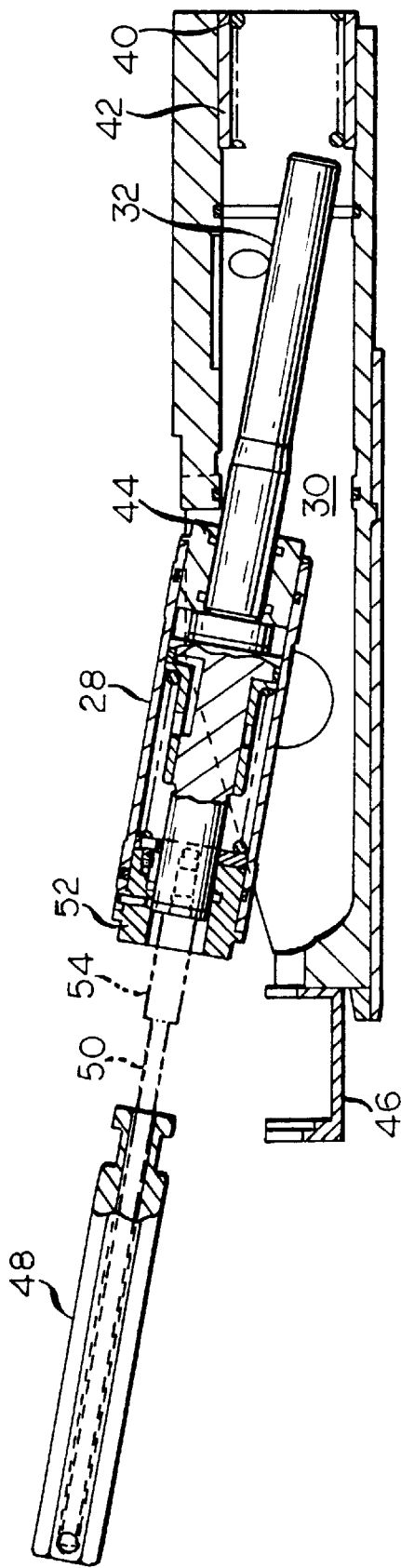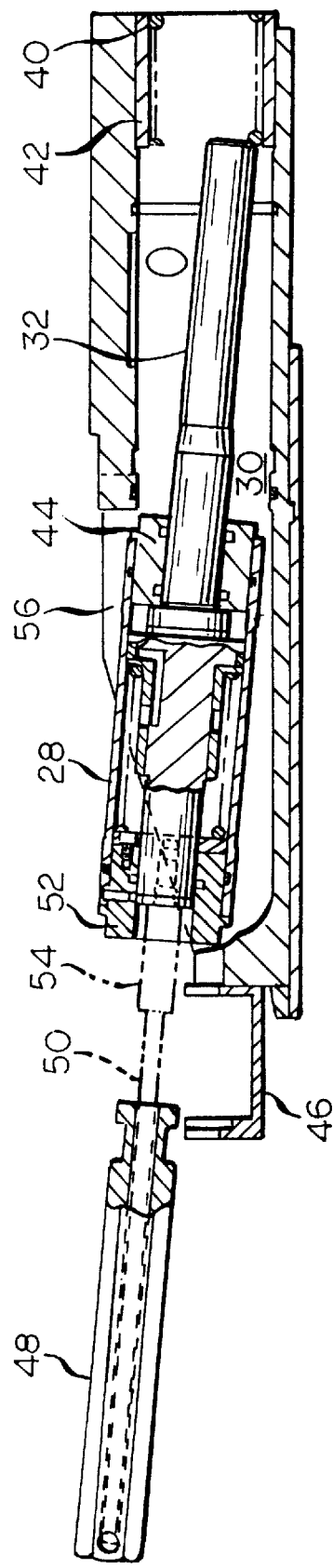

INVERT CYLINDER MECHANISM FOR GLASS FORMING MACHINE WITH REMOVABLE SHOCK ABSORBER AND METHOD OF REMOVING THE SHOCK ABSORBER

FIELD OF THE INVENTION

This invention relates to an invert cylinder mechanism for a glass container forming machine of the individual section (I.S.) type. More particularly, this invention relates to an improved shock absorber for such an invert cylinder mechanism. The invention also relates to a method for repairing or replacing an invert cylinder mechanism shock absorber of the foregoing character.

BACKGROUND OF THE INVENTION

In modern glass container manufacturing practice, most containers are manufactured on an I.S. machine. An I.S. machine has a multiplicity of side-by-side container forming sections, typically six, eight, ten or even twelve sections, and containers are formed at each such section from gobs of molten glass in two steps. In the first step, a preform of each container, which is often referred to as a blank or a parison, is formed by blowing or pressing, in an inverted position, that is, with the open end of the preform below its closed end. The closure receiving portion of the container at its open end is molded by a neck mold assembly, which is often referred to as a neck ring assembly and is made up of a separable pair of neck ring elements, and the body portion of the preform is formed by a mold assembly, which is made up of a separable pair of mold elements that, when closed, collectively define an internal cavity with a shape corresponding to the desired shape of the preform.

After completion of the blank forming step, the blank and usually two, three or even four like blanks made simultaneously at each machine section, is transferred by a 180° inverting operation to a second position where each preform is blown into the desired final shape of a container within the cavity defined by the separable pair of mold elements.

The transfer of the preform from the blank molding station to the blow molding station is by way of an invert arm assembly. The invert arm assembly is made up of a side-by-side pair of invert arm sections that oscillate in unison to transfer the neck ring assemblies between the blank mold station and the blow mold station, the transfer from the blank mold station to the blow mold station being effective to transfer the blanks carried by the neck ring assemblies from the blank mold station to the blow mold station. The invert arm sections are capable of separating from one another at the blow mold station to permit the neck ring elements in the neck ring assemblies carried thereby to separate from one another, to thereby permit the blanks to be removed from the neck ring assemblies at the start of the blow molding step. The invert arm assembly sections are then brought back together as the invert arm assembly is returned to the blank molding station to begin a repeat of the cycle.

The oscillating motion of each invert arm assembly is usually actuated by a pneumatic cylinder that drives a rack in a rectilinear pattern, and a gear carried by a shaft to which the invert arm assembly sections are secured engages the rack, which leads to arcuate motion of the shaft as a result of rectilinear motion of the rack. The drive for an invert arm assembly in an I.S. glass container forming machine as thus far described is generally described in U.S. Pat. No. 3,617,233 (Mumford), the disclosure of which is incorporated by reference herein. Other U.S. Patents describing invert arm mechanisms include U.S. Pat. No. 3,445,218 (Trudeau), U.S. Pat. No. 3,573,027 (Nuzum, Sr.) and U.S. Pat. No. 3,233,999 (Mumford), the disclosure of each of which is also incorporated by reference herein.

The reversing motions of the invert arm assembly actuation cylinder and rack involve inertial loads of considerable magnitude at each end of the cycle of motion due to the considerable mass that must be rapidly decelerated at the conclusion of each motion, and these loads are especially high as the invert arm is moving from the blank molds to the blow molds because it is carrying glass container parisons during this motion. Because of this, it has been known to connect each cylinder, in parallel, to an elongate shock absorber so that the cessation of each motion will be precise and non-jarring. This is especially important in the case of a shock absorber that is used to cushion the deceleration of the invert arm assembly at the blow mold station, because glass container parisons are being carried by the invert arm assembly at this time and are subject to distortion under unduly high inertial loads. In any case, the useful life of each such shock absorber is somewhat limited, due to the breakage and/or wear it experiences as a result of the magnitude and frequency of the shock loads to which it is exposed during the normal operation of an I.S. machine, thus requiring frequent removal of such shock absorbers for repair or replacement. Heretofore, the removal and reassembly of an I.S. machine invert arm assembly invert motion shock absorber was a time-consuming procedure because it required the removal of the entire invert arm mechanism including the disconnecting and later reconnecting of the hydraulic lines leading thereto, and because of the limited working space available to maintenance personnel involved in such procedure. A time period of the order of 4–6 hours was typically required for such procedure and, of course, no glass containers could be produced at a machine section during this time. The procedure was also somewhat unpleasant to perform because of the elevated temperatures and the noise inherently present in the environment of an operating I.S. machine.

SUMMARY OF THE INVENTION

According to the present invention, there is provided an improved invert arm assembly invert motion shock absorber for a glass container forming machine of the I.S. type, and an improved method for removing and reassembling such a shock absorber for repair or replacement. The shock absorber of the present invention is pivotable with respect to the housing of the invert cylinder mechanism with which it is used to permit it to be removed without removing the invert arm mechanism in which it is employed and without completely removing it along its longitudinal central axis from the invert cylinder mechanism assembly. In the method of the present invention, the invert cylinder mechanism invert motion shock absorber is provided with a threaded connection at its exposed end, and can be withdrawn by a removable fixture that has an elongate member with a threaded end that threadably engages the threaded connection of the invert cylinder mechanism invert motion shock absorber.

Accordingly, it is an object of the present invention to provide an improved invert cylinder mechanism for a glass container forming machine of the I.S. type. More particularly, it is an object of the present invention to provide an invert cylinder mechanism of the foregoing type with an invert motion shock absorber that is readily removable for repair or replacement. It is also an object of the present invention to provide an improved method of removing an invert motion shock absorber from an invert cylinder mechanism of a glass container forming machine of the I.S. type.

For a further understanding of the present invention and the objects thereof, attention is directed to the drawing and the following brief description thereof, to the detailed description of the preferred embodiment, and to the appended claims.

IN THE DRAWING

FIGS. 1A and 1B, collectively, show a fragmentary view, in cross-section, of an invert cylinder mechanism of a glass container forming machine in accordance with the preferred embodiment of the present invention that is adapted for use in accordance with the method of the present invention;

FIG. 3 is a fragmentary view, similar to FIG. 2, showing a later step in the removal of the invert motion shock absorber element of the invert cylinder mechanism assembly shown therein; and FIG. 4 is a fragmentary view similar to FIG. 3. showing an even later step in the removal of the invert motion shock absorber element of the invert cylinder mechanism assembly shown therein.

DETAILED DESCRIPTION OF THE PREFERRED EMBODIMENT

Figure 1A:
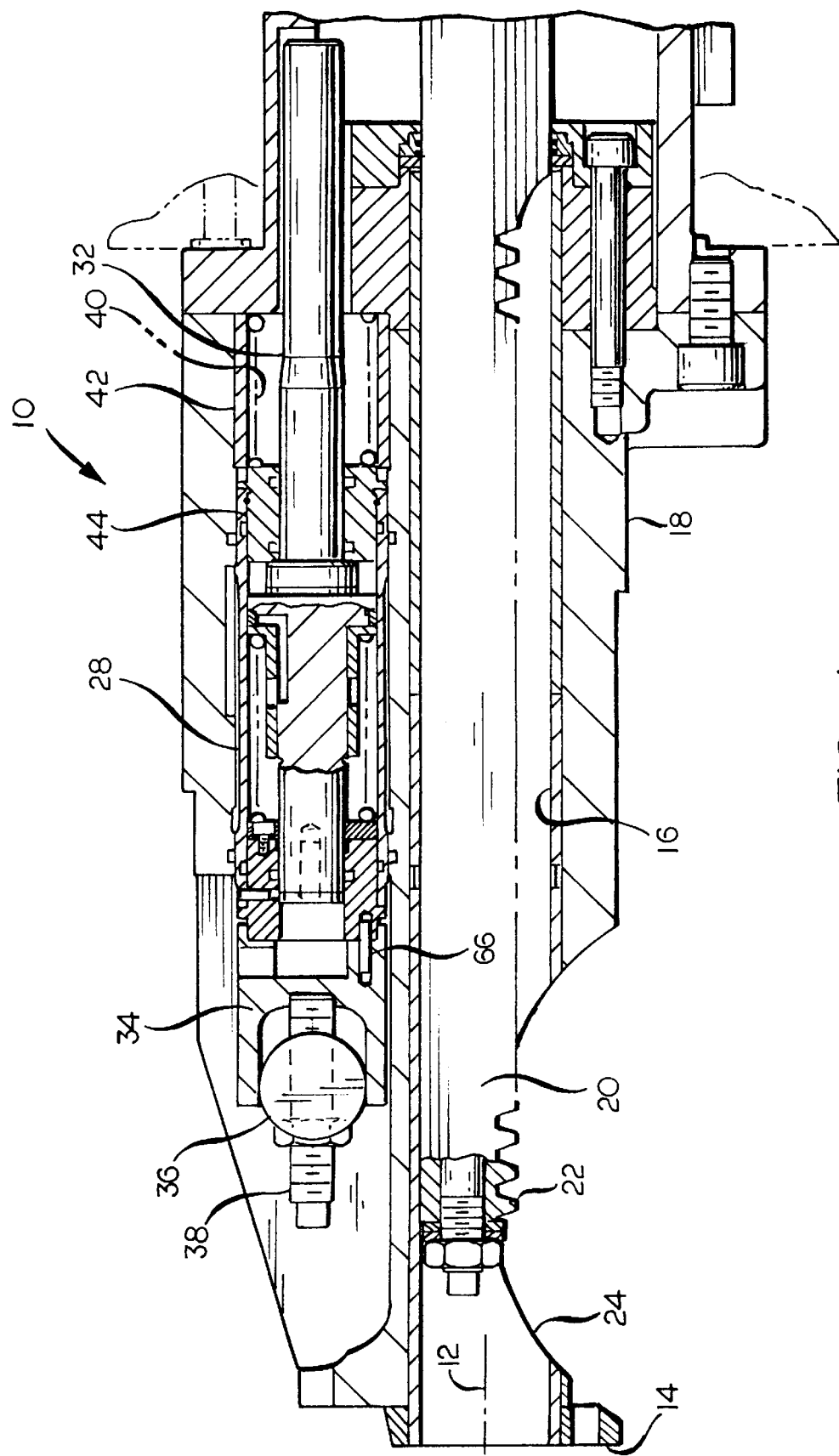

FIG. 1A illustrates the forward end of an invert cylinder mechanism for a class container forming machine of the I.S. type, the invert cylinder mechanism being generally identified by reference numeral 10 in FIG. 1. The invert cylinder mechanism 10 is positioned in an I.S. machine with its longitudinal axis 12 extending vertically, and a leading end 14 of the invert cylinder mechanism 10 is positioned at the upper end of the invert cylinder mechanism 10 in such an arrangement.

The invert cylinder mechanism is made up of a bushing 16 contained within an annular housing 18, and a rod 20, which is connected to a rod end of a pneumatic (or hydraulic) cylinder, is caused to reciprocate within the bushing 16 by the expansion and retraction of the cylinder. A series of gear teeth 22 are cut into a forward end of the rod 20 to form a gear rack, and the gear teeth 22 project into an opening 24 of annular housing 18 and the bushing 16 to permit the gear teeth 22 to engage teeth on a spur gear (not shown) that is mounted on a shaft (also not shown) to which an invert arm assembly (also not shown) of the I.S. machine is attached, to thereby cause the invert arm assembly to oscillate to and fro through and arc of 180° as the rod reciprocates within the bushing 16, as heretofore described. The rod 20 is shown in the drawing figures at its innermost position within the housing 18, and this position is the position that will place the invert arm assembly in alignment with the blank molds of an I.S. machine in preparation for the arcuate motion of the invert arm assembly, and the parisons carried thereby, to the blow mold side of the machine for blowing the parisons into containers. The longitudinal position of the rod 20 within the housing 18 is important to ensure that the invert arm assembly carried thereby extends horizontally over the blank molds of the I.S. machine.

Figure 1B:
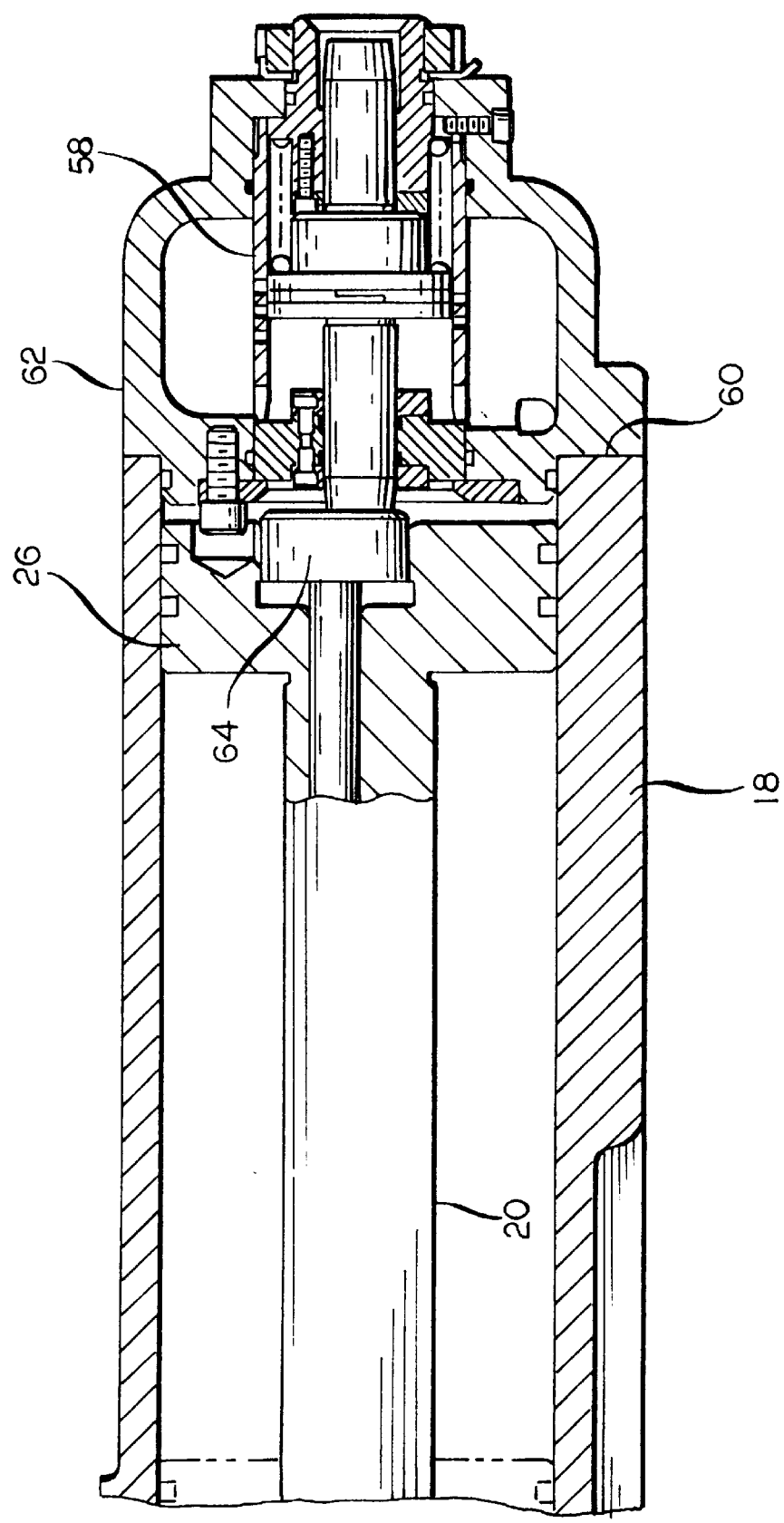

The inverting of the invert arm assembly of an I.S. machine having an invert cylinder mechanism 10 is caused by the motion of the rod 20 from the position shown in FIGS. 1A and 1B to a position well beyond the leading end 14 of the annular housing 18, and to this end the inner end of the rod 20 is connected to a piston 26 that is slideable within the annular housing 18, the piston being driven pneumatically or hydraulically by means otherwise not shown. At the end of the extending motion of the rod 20 it is important that it be stopped gently to avoid imposing excessive inertial loads on the parisons carried thereby. To this end, the invert cylinder mechanism is provided with a shock absorber 28, whose longitudinal central axis is spaced from and extends parallel to the longitudinal central axis of the cylinder rod 20, and the shock absorber 28 is removeably contained within an annular recess 30 (FIGS. 3 and 4) of the annular housing 18. The shock absorber 28 has a plunger rod 32 that is positioned to be contacted by the piston 26 at the forward end of the stroke of the rod 20, and serves to absorb the forward motion of the rod 20 by the transfer of hydraulic fluid within the shock absorber 28 in the known manner of a dash pot. In that regard, however, the hydraulic fluid within the shock absorber 28 is provided from an external source (not shown), typically a single source for all the invert arm assemblies of a given I.S. machine with appropriate flow control elements to isolate the invert arm assembly of a given machine section from those for the other sections of the same machine.

The shock absorber 28 is normally retained in the recess 30 by an end cap yoke 34, with a generally C-shaped forward end that receives a retaining pin 36, which is removable by extracting it along its longitudinal central axis. An alignment pin 66 is provided to ensure proper circumferential orientation of the shock absorber 28 relative to the yoke 34, as the proper circumferential orientation of the shock absorber 28 is needed to properly align its hydraulic ports with those of the recess 30. The position of the yoke 34 along an axis that extends parallel to the axis 12 is adjustable by an adjustment screw 38, whose inner end abuts against an adjacent surface of the yoke 34, the shock absorber 28 being resiliently biased against the screw 38 by a spring 40 contained within a sleeve 42, which is contained within the interior of the recess 30. The sleeve 42 limits the distance by which the shock absorber can be inserted into the recess 30, and the spring 40 is positioned to engage an end 44 of the shock absorber 28, which is positioned to engage the spring 40 when the shock absorber 28 is in its installed position. The spring 40 serves to outwardly bias the shock absorber 28 against the screw 38 hose longitudinal position is adjustable, to thereby accurately longitudinally position the shock absorber 28 within the recess 30

Figure 2:
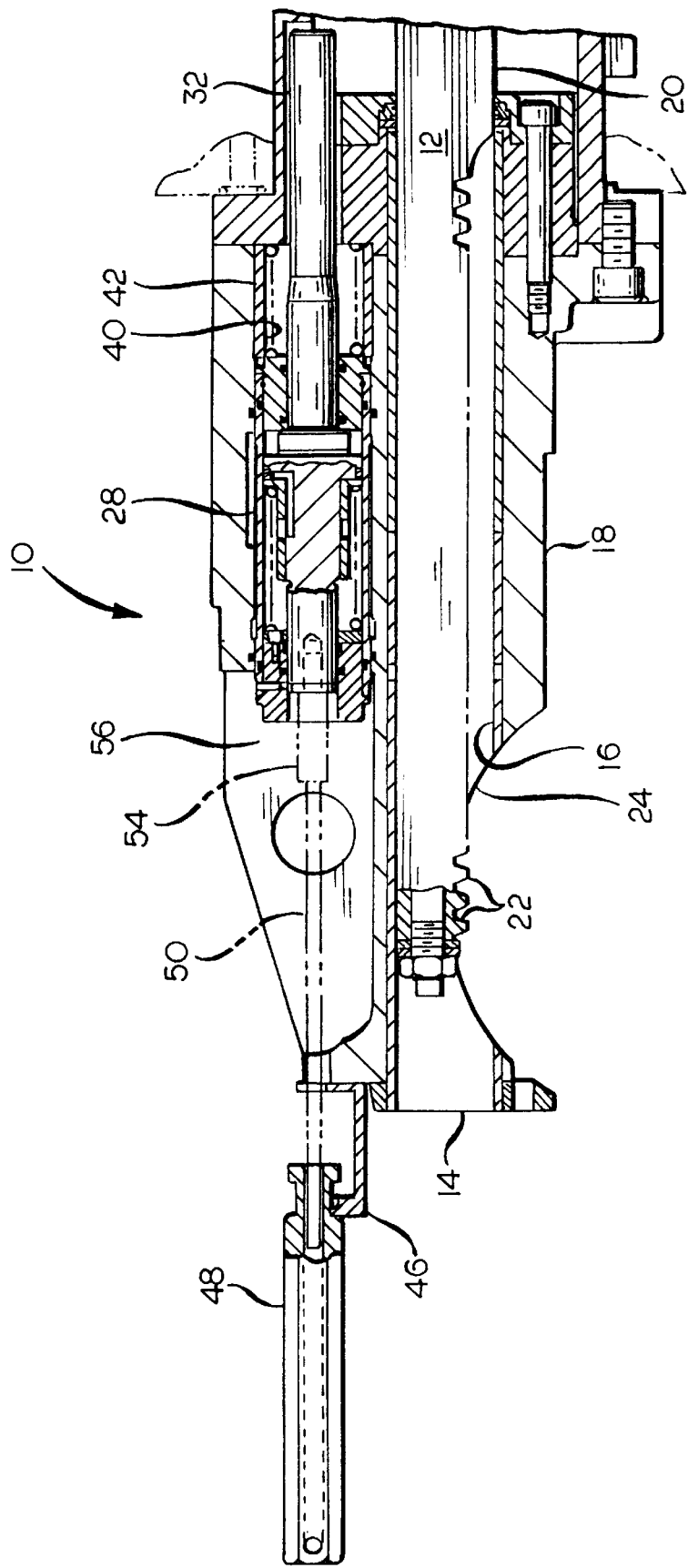
FIG. 2 is a fragmentary elevational view, in cross-section of the invert cylinder mechanism of FIG. 1, but at a reduced scale, showing a step in removing an invert motion shock absorber element thereof.

The shock absorber 28 is subject to considerable wear in service due to the frequent impact loads it must withstand, and the shock absorber 28 must, therefore, be removed for repair or replacement from time to time during the useful life of the I.S. machine in which it is used. Such removal, and later reassembly, of the shock absorber 28 or a replacement therefor may be rapidly done by the method illustrated in FIGS. 2–4. According to this method, which can be and preferably is performed without removing the invert arm assembly from the invert cylinder mechanism 10, the retaining pin 36 is removed, and then the end cap yoke 34 is removed, the space between the pin 36 and the adjacent surface of the end cap yoke 34 being greater than the expanded, free length of the spring 40 to ensure that the spring 40 will not forcibly eject the shock absorber 28 from the recess 30. A removeable bracket 46, which is in the shape of an upwardly facing U is then removably bolted to the annular housing 18, and an hexagonal elongate removal nut 48 is then positioned in the removal bracket 46, with its longitudinal central axis in alignment with the longitudinal central axis of the shock absorber 28. A threaded rod 50 is then inserted through a free end of the removal nut 48 into a threaded hole in a piston 32 of the shock absorber 28, a holding nut 54 that is engageable by a spanner wrench being provided, if needed, to prevent rotation of the piston 52 during tightening of the threaded rod 50. The removal nut 48 is then lifted with respect to the annular housing 18 until the shock absorber 28 has an outermost end extending through an opening 56 at the end of the recess 30. The removal nut 48 is then extracted along its longitudinal central axis. The shock absorber 28, or a replacement shock absorber, can be reinstalled in the recess 30 by a reversal of this procedure. The initial motion of the shock absorber 28 during removal is along its longitudinal axis, and very substantial loads are often required to effect such initial motion to overcome frictional forces within the recess. However, the very substantial mechanical advantage obtained by using a threaded rod 50 to effect his motion makes it possible to overcome such loads, and similar loads encountered in the installation of another like shock absorber 28 within the recess 30.

As is shown in FIG. 1B, the housing 18 of the invert cylinder mechanism 10 is also provided with a shock absorber 58 in a generally cup-shaped housing 62 at an opposed end 60 of the housing 18. The shock absorber 58 is positioned to be engaged by a boss 64 at the end of a rod that is concentrically positioned within the rod 20 when the piston 26 moves to its retracted position to cushion the deceleration of the piston 26 as it comes to a stop. The service requirements for the shock absorber 58 are less severe than those for the shock absorber 28, because the invert arm activated by the invert cylinder mechanism is not carrying any soft, high temperature preforms when the piston 26 is moving toward the shock absorber 58.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. In an invert cylinder mechanism for a glass container forming machine of the individual section type, said invert cylinder mechanism having: an annular housing:
   a reversible fluid-powered piston contained within said annular housing, said fluid powered piston being moveable between inner and outer positions along a rectilinear path;
   a rod connected to said piston and being moveable therewith; and a shock absorber positioned within a recess of said annular housing with its longitudinal central axis spaced from and extending parallel to a longitudinal central axis of said rod, said shock absorber being positioned to be engaged by said piston as said piston nears its outer position to absorb inertial loads as said piston decelerates to a stop at said second position, the improvement wherein;
   said recess has an opening out of alignment with a longitudinal central axis of said shock absorber in its installed position, and
   said shock absorber is pivotable with respect to said longitudinal central axis of said rod to be removable through said opening of said recess by a motion that is out of parallel to said longitudinal central axis of said rod.

2. In an invert cylinder mechanism for operating an invert arm mechanism of a glass container forming machine of the individual section type, said invert cylinder mechanism having;
   an annular housing;
   a reversable, fluid powered piston contained within said annular housing, said fluid powered piston being moveable between inner and outer positions along a rectilinear path;
   a rod connected to said piston and being moveable therewith; and
   a shock absorber positioned within a recess of said annular housing with its longitudinal central axis spaced from and extending parallel to a longitudinal central axis of said rod, said shock absorber being positioned to be engaged by said piston as said piston nears its outer position to absorb inertial loads as said piston decelerates to a stop at said second position, the method of removing said shock absorber from said recess comprising:
   providing said recess with an opening positioned out of alignment with said longitudinal central axis of said shock absorber;
   removing a means for retaining said shock absorber in said recess;
   engaging a forward end of said shock absorber with an elongate means extending parallel with a longitudinal axis of said shock absorber;
   lifting said elongate means with respect to said longitudinal central axis of said rod to lift said forward end of said shock absorber through said opening in said recess; and then
   extracting said shock absorber along its longitudinal central axis.

3. The method according to claim 2 wherein the step of engaging a forward end of said shock absorber includes:
   removably affixing a removable bracket to said forward end of said annular housing;
   inserting a nut in an opening of said removable bracket;
   inserting an elongate rod through said nut, said elongate nut having a threaded end and;
   threadably inserting said threaded end of said elongate rod into a threaded opening in an end of said shock absorber.

4. The method according to claim 3 and further comprising:
   providing a holding nut in alignment with said threaded opening of said end of said shock absorber to prevent said end of said shock absorber from rotating when said threaded end of said elongate rod is threadably inserted into said threaded opening of said end of said shock absorber.

5. The method according to claim 2 and further comprising:
   extracting said shock absorber along its longitudinal axis for a short distance before lifting said elongate means.

6. The method according to claim 5 wherein:
   the elongate means engaging the forward end of said shock absorber threadably engages the forward end of said shock absorber, and wherein the extracting of said shock absorber along its longitudinal axis is done by turning the elongate means while preventing translation of the elongate means along its longitudinal axis.

7. The method according to claim 2 in which the removal of the shock absorber from the recess is performed without removing the invert arm mechanism from the glass container forming machine.

* * * * *